(12) United States Patent
Shimizu et al.

(10) Patent No.: US 8,991,906 B2
(45) Date of Patent: Mar. 31, 2015

(54) REAR VEHICLE BODY STRUCTURE

(75) Inventors: Natsumi Shimizu, Wako (JP); Jun Horiguchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/003,866

(22) PCT Filed: Mar. 2, 2012

(86) PCT No.: PCT/JP2012/055365
§ 371 (c)(1),
(2), (4) Date: Sep. 9, 2013

(87) PCT Pub. No.: WO2012/121142
PCT Pub. Date: Sep. 13, 2012

(65) Prior Publication Data
US 2013/0341970 A1 Dec. 26, 2013

(30) Foreign Application Priority Data
Mar. 10, 2011 (JP) ................................. 2011-053355

(51) Int. Cl.
*B62D 25/08* (2006.01)
*B62D 25/02* (2006.01)
(52) U.S. Cl.
CPC .............. *B62D 25/08* (2013.01); *B62D 25/087* (2013.01); *B62D 25/02* (2013.01)
USPC .................................................... 296/193.08
(58) Field of Classification Search
USPC ........................... 296/193.08, 203.04, 187.11
See application file for complete search history.

(56) References Cited

U.S. PATENT DOCUMENTS

| 1,867,851 | A | * | 7/1932 | Ledwinka | 296/203.04 |
| 4,973,103 | A | * | 11/1990 | Imajyo et al. | 296/203.04 |
| 5,228,741 | A | * | 7/1993 | Ide | 296/187.11 |
| 7,364,225 | B2 | * | 4/2008 | Tomioka | 296/203.04 |
| 8,424,945 | B2 | * | 4/2013 | Son | 296/29 |
| 8,696,050 | B2 | * | 4/2014 | Nakamura et al. | 296/193.06 |
| 2012/0223547 | A1 | * | 9/2012 | Horiguchi et al. | 296/193.08 |
| 2013/0169005 | A1 | * | 7/2013 | Okamachi et al. | 296/193.08 |

FOREIGN PATENT DOCUMENTS

| JP | 61-203150 | | 12/1986 |
| JP | 62-26281 | | 2/1987 |
| JP | 2000-190868 | | 7/2000 |
| JP | 2007062590 A | * | 3/2007 |

(Continued)

OTHER PUBLICATIONS

PCT/JP2012/055365 written opinion translation, Jun. 13, 2014.*
International Search Report. Date of mailing May 29, 2012.

*Primary Examiner* — H Gutman
(74) *Attorney, Agent, or Firm* — Rankin, Hill & Clark LLP

(57) ABSTRACT

A rear structure of a car body includes: a rear pillar extending vertically at the rear part of the car body; a member extending from a vertically middle position of the rear pillar to the front side of the car body; a rear wheel housing disposed at a lower side of the member; and a stiffener having a lower end coupled to the rear wheel housing and an upper end coupled to the member. At least in a rear part of the member to which the upper end of the stiffener is coupled, a rear lower end of the rear part is sloped so that the rear lower end can be higher than a front lower end of the rear part.

10 Claims, 8 Drawing Sheets

(56) References Cited

FOREIGN PATENT DOCUMENTS

| | | | |
|---|---|---|---|
| JP | 2008239128 A | * | 10/2008 |
| JP | 2009-083826 | | 4/2009 |
| JP | 2010-018087 | | 1/2010 |

* cited by examiner

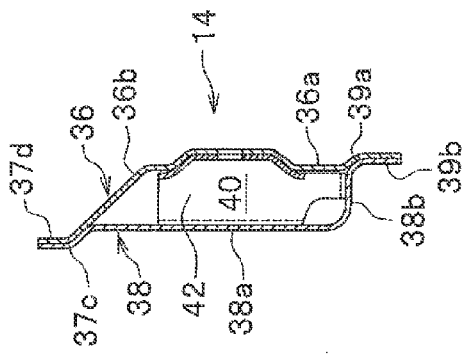

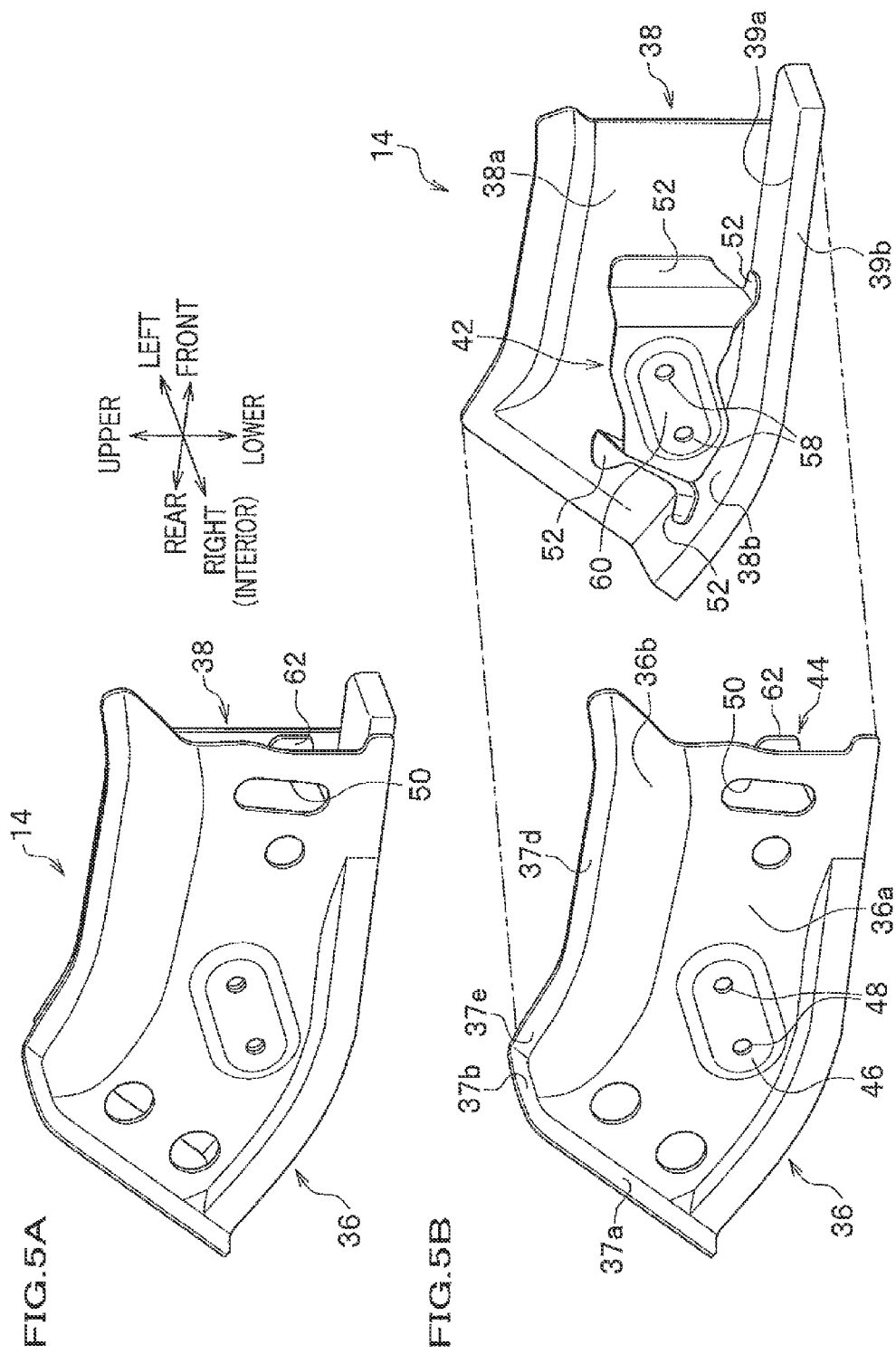

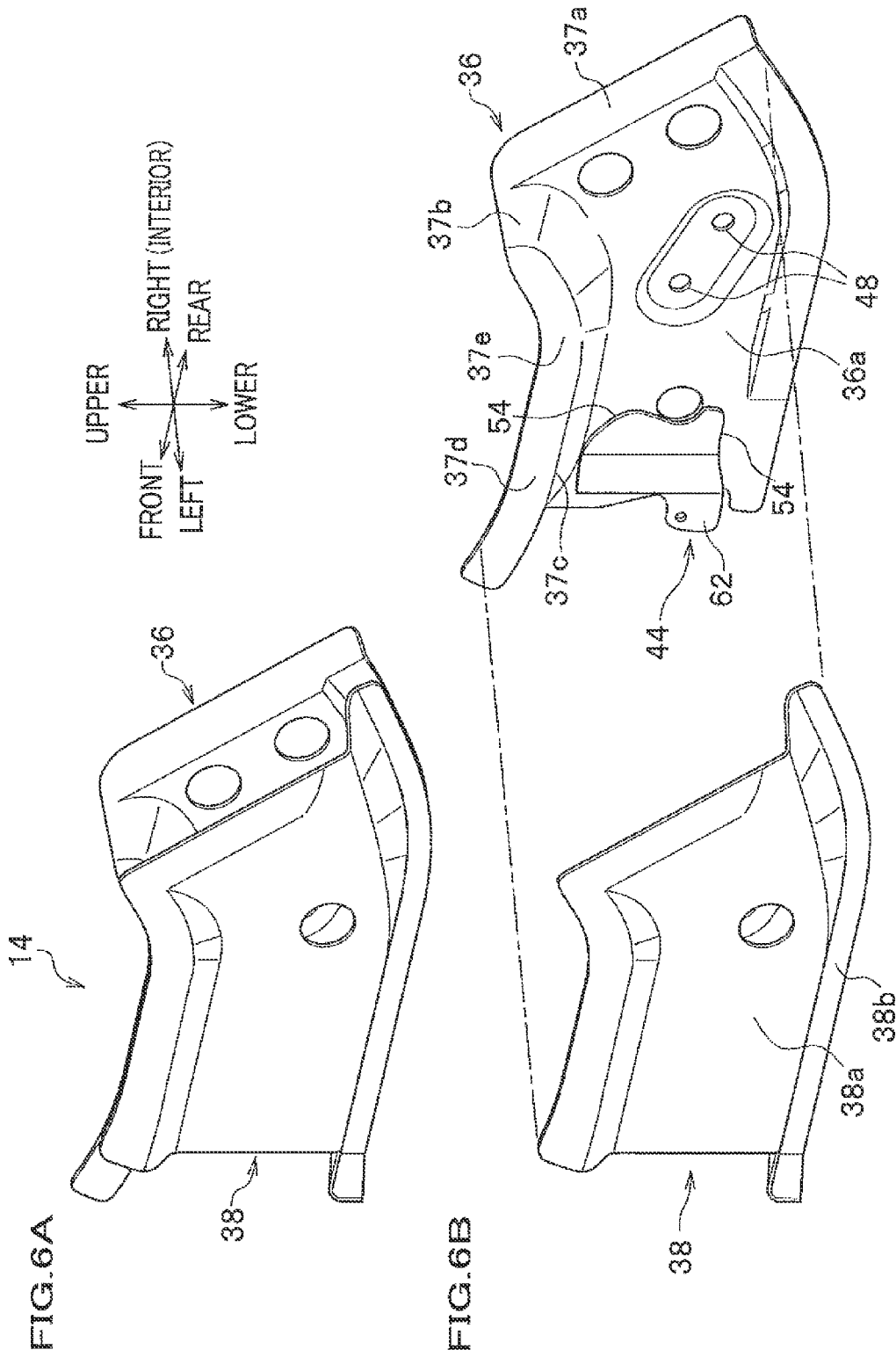

REAR VEHICLE BODY STRUCTURE

TECHNICAL FIELD

The present invention relates to a rear structure of a vehicle body of a vehicle such as an automobile.

BACKGROUND ART

As a rear structure of a vehicle body of this kind, for example, Patent Document 1 discloses, as shown in FIG. 8, a rear structure of a vehicle body wherein the front end portion 1a of a retractor attaching reinforce 1 extending along the front/rear direction of a vehicle is joined with a C pillar reinforce 2, and the rear end portion 1b of the retractor attaching reinforce 1 is arranged on the upper side of the rear portion of a wheel house extension 3.

Regarding this rear structure of a vehicle body disclosed by Patent Document 1, it is described that the rear end portion 1c of the retractor attaching reinforce 1 is arranged on an extension line L from the linear portion of the rear end edge portion 3a of the wheel house extension 3 so as to increase the support stiffness of the retractor attaching portion, and the stiffness of the entire rear portion of the vehicle body can thereby be improved.

BACKGROUND ART DOCUMENT

Patent Document

Patent Document 1: JP2009-83826 A

DISCLOSURE OF THE INVENTION

Problems to be Solved by the Invention

Incidentally, a rear suspension mechanism for rotatably supporting rear wheels is provided at the rear portion of a vehicle body, and an upward thrust load applied from a shock absorber (damper) of this rear suspension mechanism is transferred to a D pillar reinforce 5 through a rear wheel house 4, a wheel house extension 3 and a retractor attaching reinforce 1.

In this case, in this rear structure of a vehicle body disclosed by Patent Document 1, as the load transfer path (see the thick solid line in FIG. 8) between the wheel house extension 3 and the retractor attaching reinforce 1 is not linear, the load transfer efficiency from the rear wheel house 4 to the D pillar reinforce 5 drops, and the load transfer amount to the D pillar reinforce 5 decreases.

In other words, in the rear structure of a vehicle body disclosed by Patent Document 1, as the upward thrust load acting from the shock absorber of the rear suspension mechanism cannot be firmly supported (absorbed) by the D pillar reinforce 5 through the rear wheel house 4 and the like, it is necessary to absorb, by a different member, the load that cannot be absorbed by the D pillar reinforce 5.

Thus, in the rear structure of a vehicle body disclosed by Patent Document 1, in order to sufficiently support an upward thrust load from the shock absorber, it is necessary to reinforce the wheel extension 3 and the retractor attaching reinforce 1 by increasing the size and the plate thickness or by adding a different member, which results in an increase in the weight of the vehicle body.

A general object of the invention is to provide a rear structure of a vehicle body that enables improvement in the stiffness and strength of a rear portion of the vehicle body while inhibiting an increase in the weight of the vehicle body.

Means for Solving the Problems

In order to attain the above-described object, in an aspect of the present invention, a rear structure of a vehicle body includes: a rear pillar extending along an upper/lower direction at a rear portion of the vehicle body; a member extending from a certain point, along the upper/lower direction, of the rear pillar toward a front side of the vehicle body; a rear wheel house disposed lower than the rear member; and a stiffener joined at an lower end thereof with the rear wheel house and joined at an upper end thereof with the member, wherein the member is disposed with an inclination, at least at a rear part thereof being extending backward from a joining portion where the stiffener is joined, such that a lower end portion of a rear end of the rear part is located higher than a lower end portion of a front end of the rear part.

According to this aspect of the invention, at the rear part of the member, the rear part being extending backward from the joining portion where the stiffener is joined with the member, the member is disposed with an inclination such that the lower end portion of the rear end of the rear part of the member is located higher than the lower end portion of the front end of the rear part. Accordingly, in this aspect of the invention, when a load (upward thrust load) acting, for example, from the shock absorber of a rear suspension mechanism, not shown, is transferred through the rear wheel house and the stiffener to the member, it is possible to improve the load transfer efficiency from the stiffener to the member by disposing the rear part of the member with an upward inclination such that the rear end of the rear part face upward and the rear part is along the load transfer direction from the stiffener, and thereby the load transfer amount to the rear pillar can be increased. As a result, according to the invention, as it is possible to sufficiently support (absorb) a load by a pillar even without increasing the size and the plate thickness of a stiffener and a member, it is possible to improve the stiffness and the strength of the rear portion of a vehicle body, while inhibiting an increase in the weight of the vehicle body.

Incidentally, in the present invention, 'stiffness' refers to non-deformability of a vehicle body (strength of non-deformation of the vehicle body) against an external force, and 'strength' refers to an overall strength including various strengths such as the compressive strength, the tensile strength, the torsional strength, bending strength, and the like.

In another aspect of the invention, the rear pillar is disposed with an inclination rising forward such that an upper end thereof is located on a front side; and the rear part is inclined such as to be substantially perpendicular to the rear pillar.

According to this aspect of the invention, by disposing the rear part of the member with an inclination such as to be substantially perpendicular to the rear pillar, a load from the member can be transferred, being dispersed with an appropriate balance along the upper/lower direction of the rear pillar, which enables improving the load transfer efficiency to the rear pillar.

Further, in another aspect of the invention, the stiffener is disposed with an inclination rising backward such that an upper end thereof is located posterior to a lower end thereof and such that the stiffener is substantially perpendicular to the rear pillar.

According to this aspect of the invention, the stiffener is disposed in a state of being inclined substantially perpendicular to the rear pillar, and the load transfer efficiency from the stiffener to the member and the rear pillar can thereby be improved.

Still further, in another aspect of the invention, the rear pillar is formed by a rear pillar upper on an upper side and a rear pillar lower on a lower side; the rear pillar includes a lap portion formed by that a lower end of the rear pillar upper and an upper end of the rear pillar lower are superimposed and joined with each other; and a rear end of the member is joined with the lap portion.

According to this aspect of the invention, a lap portion formed by superimposing and joining the lower end of the rear pillar upper and the upper end of the rear pillar lower with each other is provided, and the lap portion can be reinforced by joining the member with the lap portion. Yet further, a load transferred from the stiffener can be received by the lap portion, which is formed by lapping two plates, and the load is further firmly supported by the rear pillar having the lap portion.

Yet further, in another aspect of the invention, the rear pillar has a front surface facing the front side of the vehicle body; and a rear end of the member is joined with the front surface, being hit against the front surface.

According to this aspect of the invention, the rear end of the member is joined, by being hit against, with the front surface of the rear pillar, and the lap portion can be thus reinforced. Further, a load transferred from the stiffener can be further firmly supported by the lap portion on the front surface of the rear pillar.

Still further, in another aspect of the invention, the member includes an inner member and an outer member; the inner member has an inner vertical wall on a vehicle interior side and an inner upper wall extending from an upper end of the inner vertical wall toward a vehicle exterior side; the outer member has an outer vertical wall disposed on the vehicle exterior side and facing the inner vertical wall, and an outer lower wall extending from an lower end of the outer vertical wall toward the vehicle interior side; a lower end of the inner vertical wall and an extended end of the outer lower wall are joined with each other, an upper end of the outer vertical wall and an extended end of the inner upper wall are joined with each other, and a closed cross section is thereby formed; the inner member includes a vertical flange extending from a rear end of the inner vertical wall toward the vehicle interior side and facing the front surface of the rear pillar, and a horizontal flange extending from a rear end of the inner upper wall toward an upper side of the vehicle body; and at least the vertical flange is joined with the front surface of the rear pillar.

In comparison with a case of forming flanges respectively on the vertical, the upper, and the lower walls of an inner member by forming the inner member with a cross-section in a hat shape, it is possible, according to this aspect of the invention, by providing the inner member with the vertical flange and the horizontal flange, to improve the formability of the flanges for joining the rear end of the member with, by hitting against, the front surface of the rear pillar. Also, it is possible to efficiently transfer a load, which transfers from the member toward the rear pillar, by the vertical flange and the horizontal flange formed on the inner member.

Further, in another aspect of the invention, the rear pillar includes a pillar flange extending from the front surface toward the front side of the vehicle body; the inner upper wall includes an upper wall flange standing upward from the extended end and facing the pillar flange; and the pillar flange and an end portion, on a rear side of the vehicle body, of the upper wall flange are joined with each other.

According to this aspect of the invention, the vehicle-rear-side end portion (rear end) of the upper wall flange located in the vicinity of the horizontal flange of the inner member is joined with the pillar flange, and while the problem with formability (described later in an embodiment) of the inner member is thus solved, the load transfer efficiency from the horizontal flange of the inner member to the rear pillar can be improved.

Still further, in another aspect of the invention, the rear structure of a vehicle body includes a bulkhead disposed such as to partition the closed cross section of the member into plural divisions along a front/rear direction of the vehicle body; and an upper end of the stiffener is disposed at a position superimposing with the bulkhead with respect to a vehicle transverse direction, and is joined with the bulkhead through the inner member.

According to this aspect of the invention, the stiffener is joined with the bulkhead through the inner member, the stiffness of the member alone is thereby improved, and the joining strength between the stiffener and the member is also improved, which enables further improvement in the efficiency of load transfer to the rear pillar.

Yet further, in another aspect of the invention, plural bulkheads are arranged at a certain distance therebetween along a longitudinal direction of the member; at least one of the plural bulkheads is joined with the inner member; and at least another one of the plural bulkheads is joined with the outer member.

According to this aspect of the invention, at least one bulkhead is joined with each of the inner member and the outer member of the member, deformation of the inner member and the outer member is thereby inhibited, and as a result, the stiffness and the strength of the member alone can be further improved.

Further, in another aspect of the invention, the bulkhead is attached to either one of the inner vertical wall or the outer vertical wall and a working penetration hole is formed through the other vertical wall; and the bulkhead is provided with a wall partitioning flange extending along the other vertical wall to a position accessible from the working penetration hole.

According to this aspect of the invention, even in a case of forming the closed cross section by joining the inner member and the outer member of the member, it is easy to access the wall partitioning flange of the bulkhead through the working penetration hole. For example, making use of the working penetration hole, spot welding work using a spot welding gun, screw tightening work, and the like can be carried out. As a result, according to this aspect of the invention, the bulkhead joined with either one of the inner vertical wall or the outer vertical wall can be easily joined with the other vertical wall, and the stiffness and the strength of the member can be improved.

Still further, in another aspect of the invention, the stiffener has a lower end formed with a cross-section in a hat state and an upper end formed in a surface state; and the stiffener is formed such that an open cross-section of a region between the lower end and the upper end gradually shrinks from the lower end toward the upper end.

According to this aspect of the invention, the stiffener has a lower end formed with a cross-section in a hat state, the stiffener is formed such that the cross-section is open in a region from the lower end up to a certain point toward the upper end, and accordingly, a high stiffness and a high strength are attained to enable ensured transfer of a load. Further, the upper end of the stiffener, which is the joining part with the member, is formed in a surface shape without an open cross-section, and it is thereby possible to efficiently transfer a load to the surface of the vertical wall of the member (the inner member). Further, by gradually reducing, toward the upper end, the size of the open cross-section in the region between the upper end and the lower end of the stiffener, it is possible to eliminate a rapid change in the open cross-sectional shape in the region between the upper end and the lower end of the stiffener and thus enable a high efficiency of the load transfer.

Yet further, in another aspect of the invention, the stiffener has an endward expanding shape portion such that a width along a front/rear direction of the vehicle body becomes gradually larger from a certain point, along a longitudinal direction, of the stiffener toward the upper end.

According to this aspect of the invention, the stiffener is provided with the endward expanding shape portion such that the width along the front/rear direction of the vehicle body becomes gradually larger from a certain point, along the longitudinal direction, of the stiffener toward the upper end, and a load is transferred from the stiffener to the member, being thereby dispersed into a wide range, which enables improvement in the load transfer efficiency from the stiffener to the member.

Further, in another aspect of the invention, the upper end of the stiffener is provided with at least two joining portions.

According to this aspect of the invention, the upper end of the stiffener joined with the member is provided with at least two joining portions, thereby, turning of the stiffener in the vehicle front/rear direction with either of the joining portions as the turning center is inhibited, and a load that is transferred from the stiffener to the member can be efficiently transferred without escaping.

Advantage of the Invention

According to the present invention, it is possible to provide a rear structure of a vehicle body that enables improvement in the stiffness of a rear portion of the vehicle body while inhibiting an increase in the weight of the vehicle body.

BRIEF DESCRIPTION OF THE DRAWINGS

FIGS. 3A and 3B are perspective views showing a state that a member is joined with a rear pillar, wherein FIG. 3A shows a state before joining and FIG. 3B shows a state after joining;

FIG. 4A is a front view of the member, FIG. 4B is a transparent front view making the inner member shown in FIG. 4A transparent, and FIG. 4C is a vertical cross-sectional view taken along line IVC-IVC in FIG. 4A;

FIG. 5A is a perspective view of the member viewed from the vehicle interior side, and FIG. 5B is an exploded perspective view of the member shown in FIG. 5A;

FIG. 6A is a perspective view of the member viewed from the vehicle exterior side, and FIG. 6B is an exploded perspective view of the member shown in FIG. 6A;

EMBODIMENT FOR CARRYING OUT THE INVENTION

Figure 1:
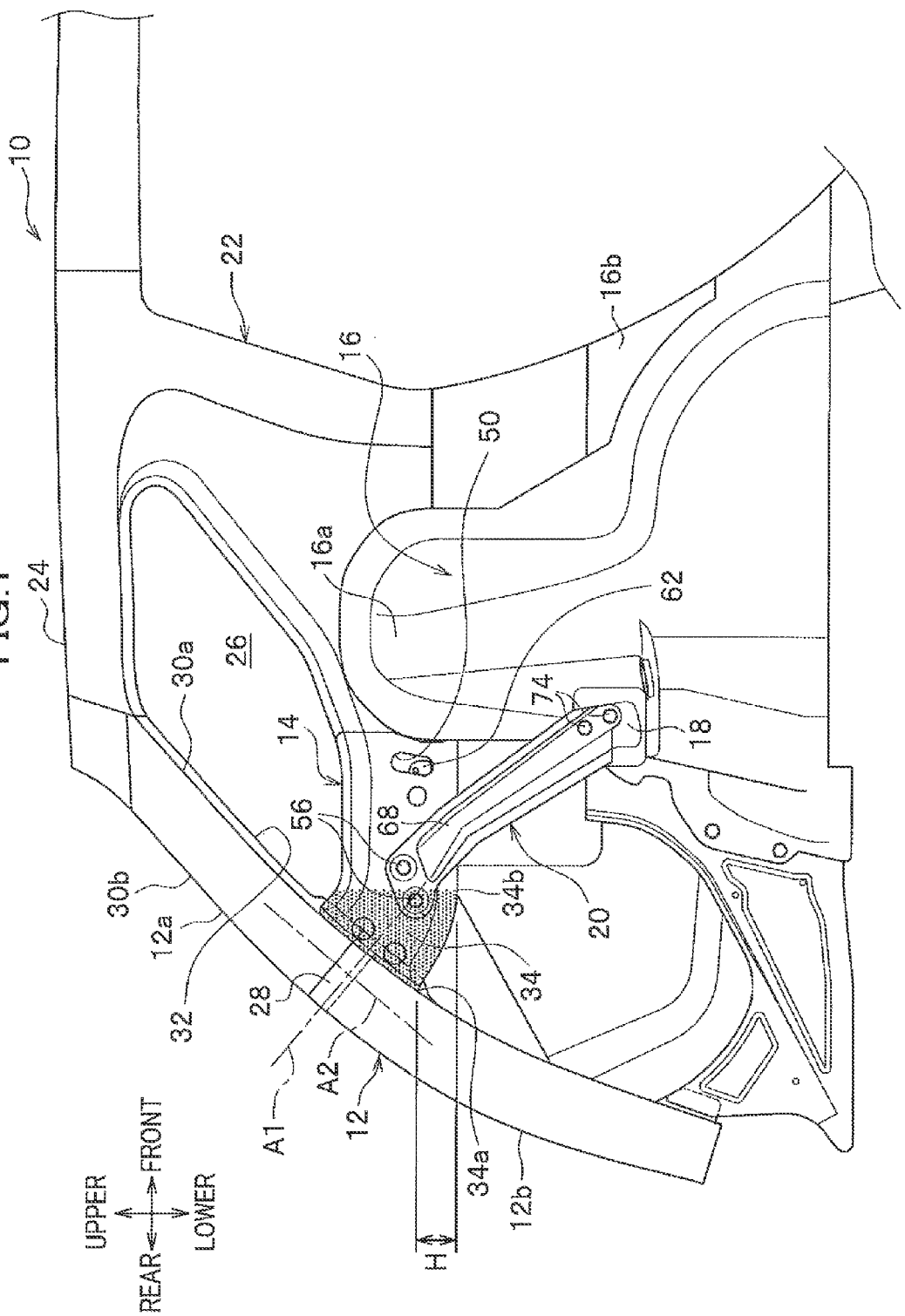
FIG. 1 is a side view, from the vehicle interior side, of the left side portion of a rear portion of a vehicle body of an automobile to which a rear structure of a vehicle body according to an embodiment of the present invention is applied.
Figure 2:
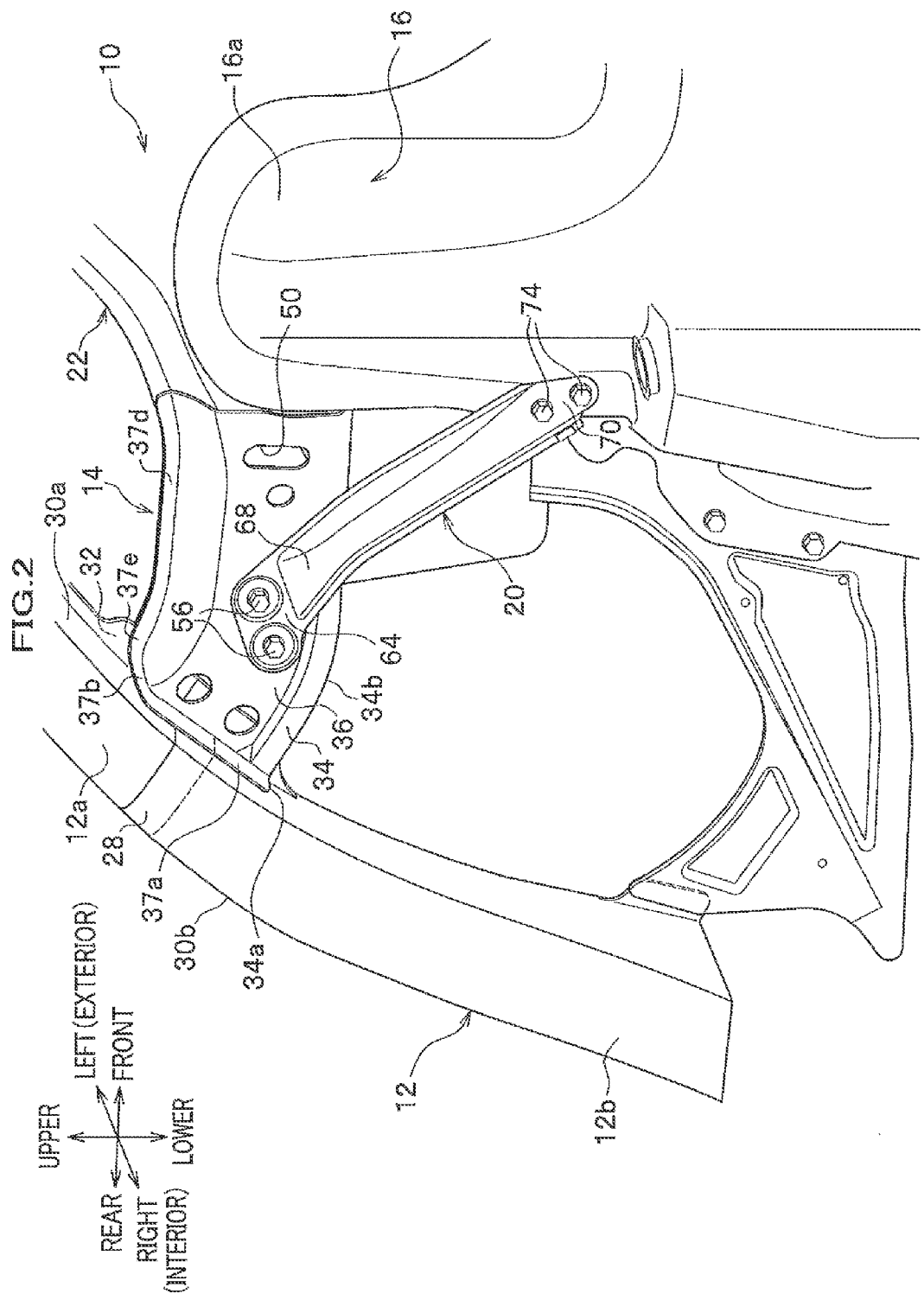
FIG. 2 is a perspective view, from an oblique direction, of the rear portion of the vehicle body shown in FIG. 1.

In the following, an embodiment of the present invention will be described in detail, referring to the drawings, as appropriate. FIG. 1 is a side view, from the vehicle interior side, of the left side portion of a rear portion of a vehicle body of an automobile to which a rear structure of a vehicle body according to an embodiment of the present invention is applied. FIG. 2 is a perspective view, from an oblique direction, of the rear portion of the vehicle body shown in FIG. 1. Incidentally, upper/lower direction (vertical direction), front/rear direction (longitudinal direction), and left/right direction described below are assumed to agree with the directions shown in FIG. 1 and FIG. 2.

As shown in FIG. 1 and FIG. 2, a vehicle not shown includes a rear pillar 12 extending along the upper/lower direction at a vehicle body rear portion 10 and a member 14 extending from a certain point, along the upper/lower direction, of this rear pillar 12 toward the front side of the vehicle body. Further, the vehicle not shown includes a rear wheel house 16 that is disposed lower than the member 14 and formed by a rear wheel house inner 16a on the vehicle interior side and a rear wheel house outer 16b on the vehicle exterior side, and a stiffener 20 whose lower end is joined with the rear side of the rear wheel house inner 16a through a bracket 18 and whose upper end is joined with the member 14.

Incidentally, in the present embodiment, 'joining' refers to firmly and integrally fixing plural members by joining means, for example, spot welding, laser welding, friction agitation joining, or the like.

The rear pillar (D pillar) 12 is disposed with inclination in a state of rising forward such that the upper end thereof is located on the front side. The upper end of the rear pillar 12 is joined with a roof side portion 24 of another rear pillar (C pillar) 22 formed anterior to the rear pillar 12 and wider than the rear pillar 12. In this case, at the upper part of the vehicle body rear portion 10, provided is a window portion 26 that is formed by a spatial portion surrounded by the upper side (a later-described rear pillar upper 12a) of the rear pillar 12, the other rear pillar 22, and the member 14.

The rear pillar 12 is formed by the rear pillar upper 12a on the upper side and a rear pillar lower 12b on the lower side, and is provided with a lap portion 28 that is formed by superimposing and joining the lower end of the rear pillar upper 12a and the upper end of a rear pillar lower 12b with each other.

Further, the rear pillar 12 has a front surface 30a and a rear surface 30b facing each other along the vehicle body front/rear direction, and is provided with a pillar flange 32 extending from the front surface 30a toward the front side of the vehicle body.

Figure 3A:
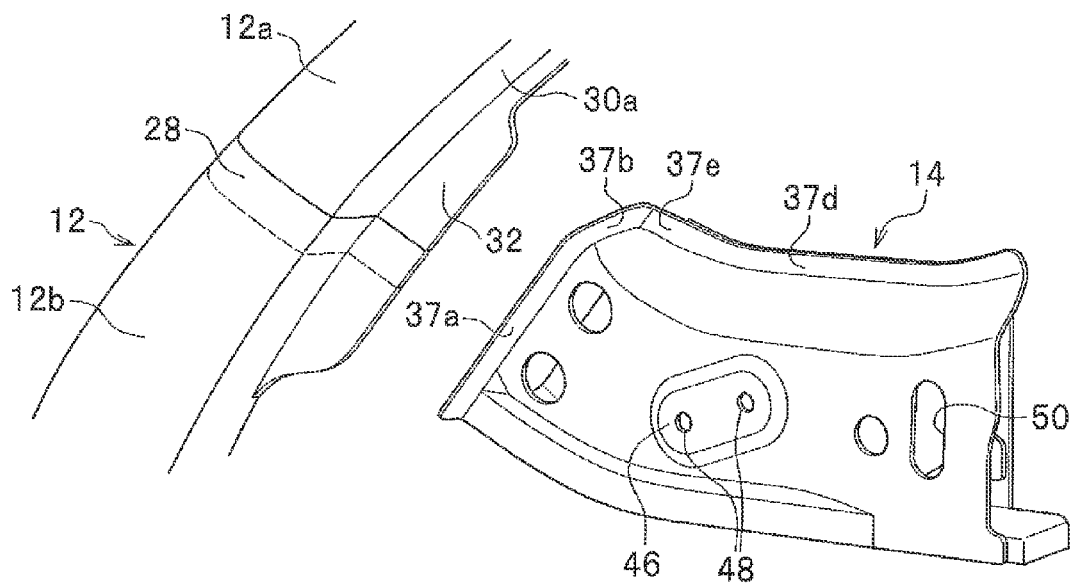
Figure 3B:
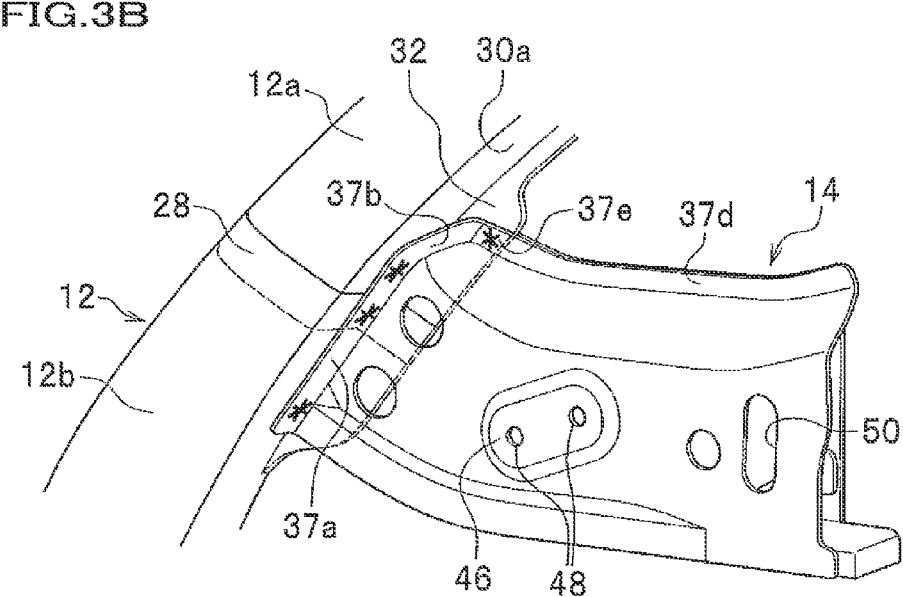

FIGS. 3(a) and 3(b) are perspective views showing a state that the member is joined with the rear pillar, wherein FIG. 3A shows a state before joining and FIG. 3B shows a state after joining.

The front end of the member 14 extending along the front/rear direction of the vehicle body rear portion 10 is joined with the lower end of the rear portion of the other rear pillar 22 (see FIG. 2), and the rear end (a later-described vertical flange 37a) of the member 14 is joined, by being hit against, with the front surface 30a of the rear pillar 12 including the above-described lap portion 28 (see FIGS. 3A and 3B). Incidentally, in FIG. 3B, symbol '*' represents a spot welding part.

Further, the member 14 is disposed with inclination at least at a rear part 34 (see dot portion in FIG. 1), which extends from the center of the joining portion where the upper end of the stiffener 20 is joined, such that the rear-end lower end portion 34a of the rear part 34 is located higher than the front-end lower end portion 34b of the rear part 34.

That is, as shown in FIG. 1, the member 14 is formed such as to extend substantially linearly and substantially along the horizontal direction from the front end of the member 14, which is along the vehicle body front/rear direction, to the joining portion where the upper end of the stiffener 20 is joined, and the member 14 is further formed, at the rear part 34 extending backward from the joining portion, such as to curve upward toward the rear-end lower end portion 34a of the member 14 from the front-end lower end portion 34b of the rear part 34 of the member 14. The member 14 is formed such that the positions are different between the rear-end lower end portion 34a and the front-end lower end portion 34b of the rear part 34 in the height direction by dimension H. Herein, the center line A1 of the rear part 34 of the member 14 is arranged with inclination such as to be substantially perpendicular to the center line A2 of the rear pillar 12.

FIG. 4A is a front view of the member, FIG. 4B is a transparent front view making the inner member shown in FIG. 4A transparent, and FIG. 4C is a vertical cross-sectional view taken along line IVC-IVC in FIG. 4(a). FIG. 5A is a perspective view of the member viewed from the vehicle interior side, and FIG. 5B is an exploded perspective view of the member shown in FIG. 5A. FIG. 6A is a perspective view of the member viewed from the vehicle exterior side, and FIG. 6B is an exploded perspective view of the member shown in FIG. 6A.

Further, the member 14 includes an inner member 36 disposed on the vehicle interior side, an outer member 38 disposed on the vehicle exterior side (see FIG. 4C), and a first bulkhead 42 and a second bulkhead 44 that are disposed such as to partition a later-described closed cross section 40 into plural divisions along the vehicle body front/rear direction (see FIG. 4A and FIG. 4B). Incidentally, in the present embodiment, as an example, plural bulkheads, which are the first bulkhead 42 and the second bulkhead 44, are described, however, arrangement may be made such as to provide either one of these bulkheads.

The inner member 36 includes, as shown in FIGS. 5A, 5B, 6A and 6B, an inner vertical wall 36a on the vehicle interior side and an inner upper wall 36b extending from the upper end of the inner vertical wall 36a toward the vehicle exterior side. Further, the inner member 36 includes a vertical flange 37a, which is extended from the rear end of the inner vertical wall 36a toward the vehicle interior side and is joined with the front surface 30a of the rear pillar 12, a horizontal flange 37b, which is extended from the rear end of the inner upper wall 36b toward the upper side of the vehicle body, an extended end 37c (see FIG. 6B), which forms the end edge portion (edge line portion) of the inner upper wall 36b, and an upper wall flange 37d, which stands upward from the extended end 37c and faces the pillar flange 32.

A vehicle-rear-side end portion 37e is provided at the boundary part, which is the rear end of an upper wall flange 37d and adjoining the horizontal flange 37b. The vehicle-rear-side end portion 37e of the upper wall flange 37d is joined with the pillar flange 32 protruding forward from the front surface 30a of the rear pillar 12 (see FIG. 3B).

At the central portion of the inner vertical wall 36a, a later-described tightening portion 46, at which the upper end of the stiffener 20 is tightened, is provided, and the tightening portion 46 is provided with a pair of screw tightening holes 48. An elongated and rounded working penetration hole 50 is formed in the vicinity of the side end portion along the longitudinal direction of the inner vertical wall 36a adjacent to the rear wheel house inner 16a.

The outer member 38 includes, as shown in FIGS. 5A, 5B, 6A and 6B, an outer vertical wall 38a, which is disposed on the vehicle exterior side and facing the inner vertical wall 36a, and an outer lower wall 38b, which is extended from the lower end of the outer vertical wall 38a toward the vehicle interior side. Further, the outer member 38 has an extended end 39a (see FIG. 5(b)) forming the end edge portion (edge line portion) of the outer lower wall 38b, and a lower wall flange 39b formed downward from the extended end 39a.

In this case, the closed cross section 40 substantially in a rectangular shape is formed at least by that the lower end of the inner vertical wall 36a and the extended end 39a of the outer lower wall 38b are joined with each other, and the upper end of the outer vertical wall 38a and the extended end 37c of the inner upper wall 36b are joined with each other (see FIG. 4C).

Inside the closed cross section 40 of the member 14, the first bulkhead 42 and the second bulkhead 44 are disposed with a certain distance therebetween along the longitudinal direction of the member 14 (see FIG. 5B and FIG. 6B). In this case, the first bulkhead 42 is joined with a substantially central portion of the outer member 38 through plural first joining portions 52; and the second bulkhead 44 is joined, through plural second joining portions 54, with a part in the vicinity of the side end portion of the inner member 36 adjacent to the rear wheel house inner 16a.

The first bulkhead 42 is provided with a tightening portion 60 with a pair of screw tightening holes 58, where screw members 56 (see FIG. 2) are tightened, the tightening portion 60 being disposed at a position corresponding to the tightening portion 46 of the inner member 36. Further, at the first bulkhead 42, nuts, not shown, which are tightened with the screw portions of the screw members 56 (see FIG. 2), are fixed on the surface on the outer member 38 side (the vehicle exterior side) of the tightening portion 60 and at a positions corresponding to the screw tightening holes 58. After the inner member 36 and the outer member 38 are joined with each other, the first bulkhead 42 is joined also with the inner member 36 by that the screw members 56 are tightened to the nuts through the tightening portion 46 of the inner member 36 and the tightening portion 60 of the first bulkhead 42.

The second bulkhead 44 is provided with a wall partitioning flange 62, which is a tongue piece extending along the inner vertical wall 36a to a position accessible from the working penetration hole 50 formed through the inner member 36. After the inner member 36 and the outer member 38 are joined with each other, the second bulkhead 44 is also joined with the outer member 38 by that the operator carries out a task of joining the wall partitioning flange 62 and the outer member 38 through the working penetration hole 50.

Figure 7C:
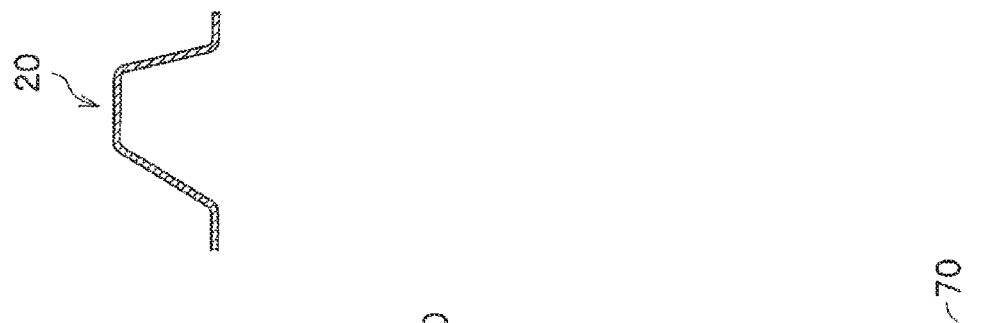
FIG. 7C is a view of an end surface taken along line VIIC-VIIC in FIG. 7A.
Figure 7B:
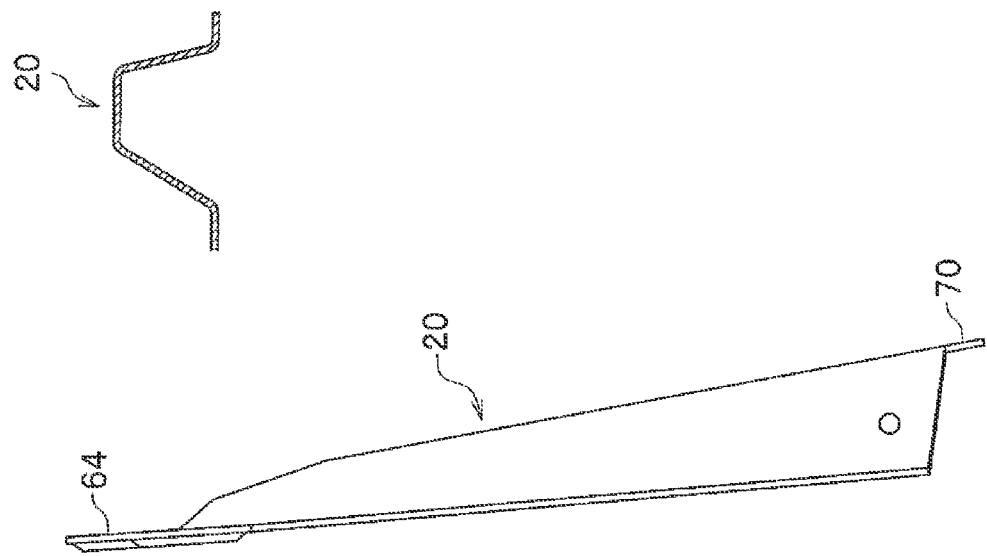
FIG. 7B is an arrow view in direction of arrow Z in FIG. 7A.
Figure 7A:
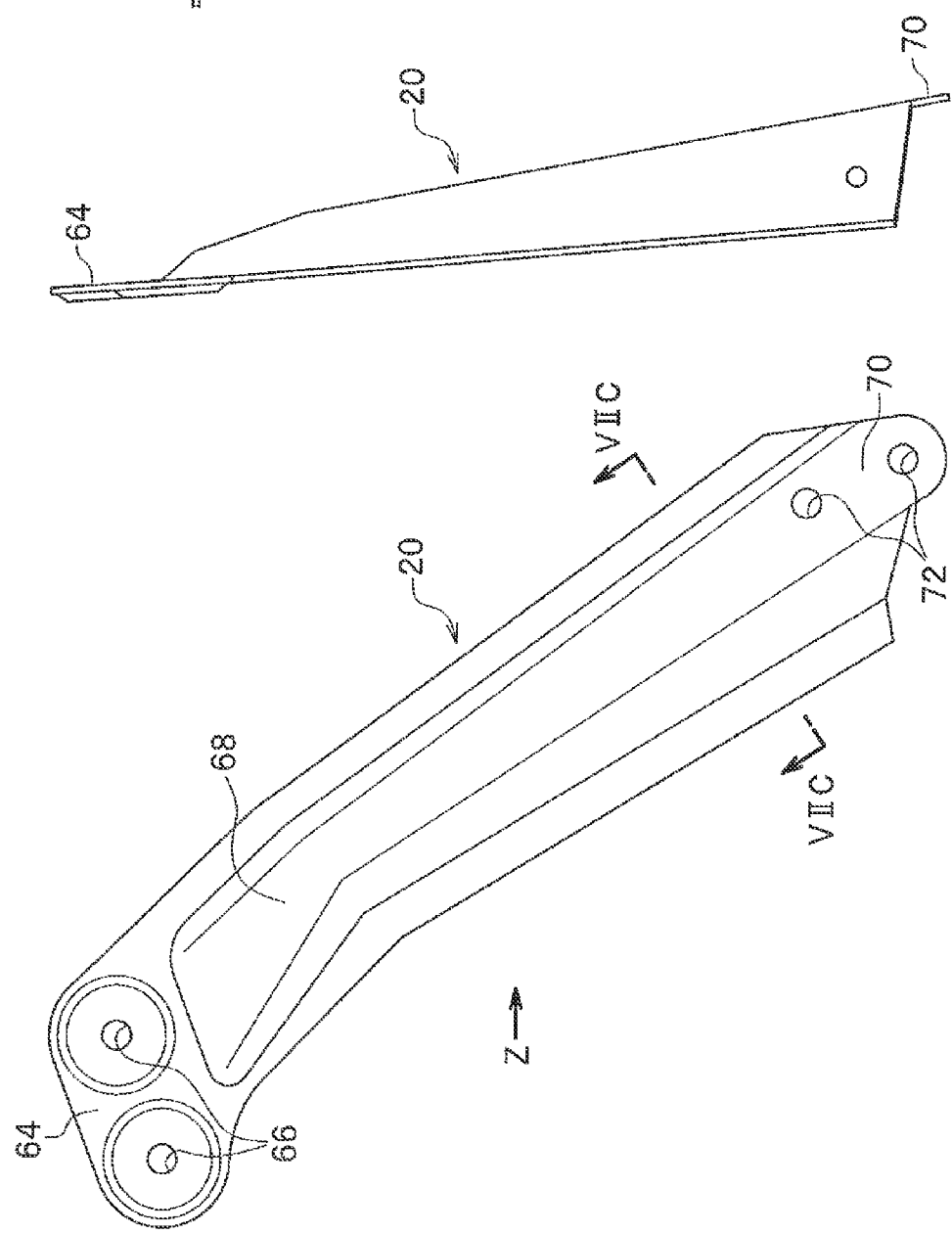
FIG. 7A is a front view of the stiffener.
Figure 8:
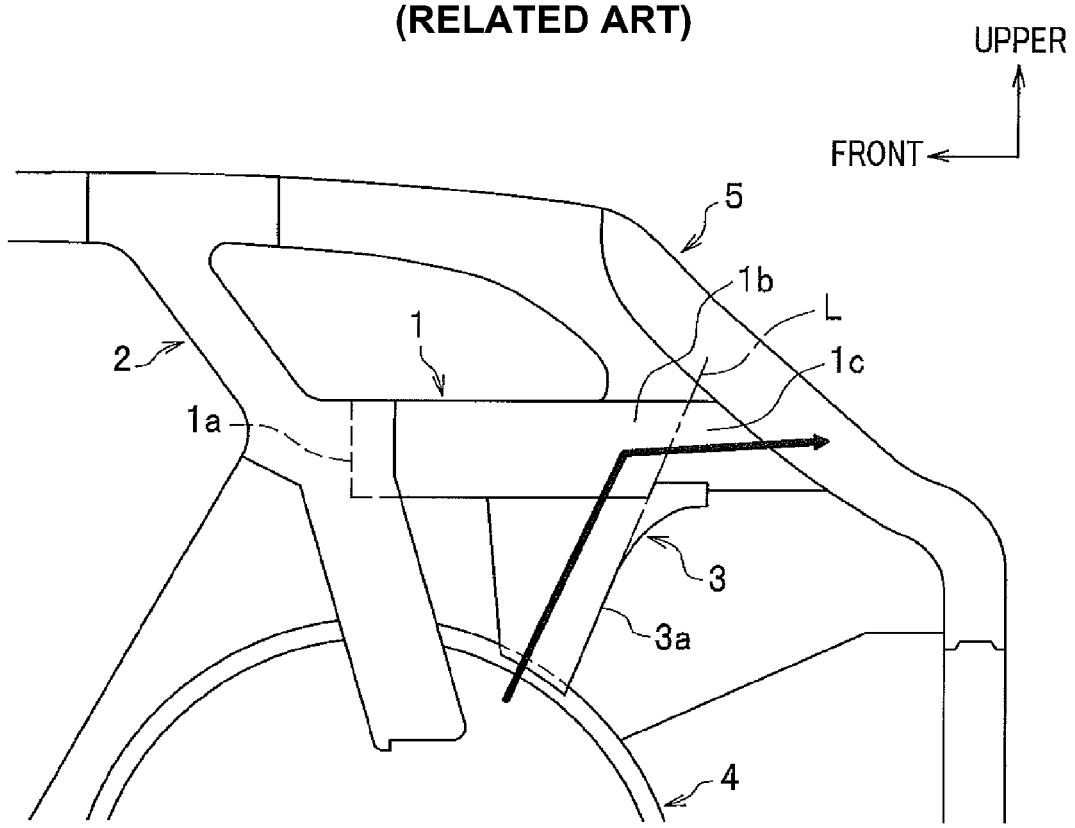
FIG. 8 is a side view showing a rear structure of a vehicle body according to a conventional art.

FIG. 7A is a front view of the stiffener, FIG. 7B is an arrow view in direction of arrow Z in FIG. 7A, and FIG. 7C is a view of an end surface taken along line VIIC-VIIC in FIG. 7A.

The stiffener 20 is, as shown in FIG. 1, disposed such that the upper end thereof is located posterior to the lower end thereof, the stiffener being inclined rising backward, and the stiffener 20 is inclined such as to be substantially perpendicular to the rear pillar 12. Further, the stiffener 20 has a lower end formed with a cross-section in a hat state (see FIG. 7C) and an upper end formed in a surface state (see FIG. 7B), and the stiffener 20 is formed such that an open cross-section of a region between the lower end and the upper end gradually shrinks from the lower end toward the upper end.

The upper end of the stiffener 20 is disposed at a position where the upper end of the stiffener 20 is superimposed, with respect to the vehicle transverse direction, with the first bulkhead 42 (the tightening portion 60) located substantially at the central portion inside the closed cross section 40 of the member 14 (see FIG. 1, FIG. 4A, and FIG. 4B). A first tightening portion 64 in a flat plate shape is provided at the upper end of the stiffener 20, and the first tightening portion 64 is provided with a pair of screw tightening holes 66 in parallel to each other.

In this case, the screw members 56 are screwed in the pair of screw tightening holes 66 formed through the stiffener 20, the pair of screw tightening holes 48 formed thorough the inner member 36, and the pair of screw tightening holes 58 of the first bulkhead 42 joined with the outer member 38, and these three are thereby integrally screw-tightened (tightened together). Thus, the upper end of the stiffener 20 is screw-tightened to the member 14 (the inner member 36 and the outer member 38). Incidentally, the pair of screw tightening holes 66 formed at the upper end of the stiffener 20 function as two joining portions.

On the lower side of the first tightening portion 64 of the stiffener 20, provided is an endward expanding shape portion 68 such that a width along the front/rear direction of the vehicle body becomes gradually larger from a certain point, along the longitudinal direction, of the stiffener 20 toward the upper end (see FIG. 7A).

The lower end of the stiffener 20 is provided with a second tightening portion 70 that is tightened to the rear central portion of the rear wheel house inner 16a through the bracket 18. The second tightening portion 70 is provided with a pair of screw-tightening holes 72 that are extensionally located at a certain distance therebetween along the longitudinal direction of the stiffener 20. The lower end of the stiffener 20 is fixed to the rear wheel house inner 16a by that a pair of screw members 74 (see FIG. 2) is screwed in the pair of screw-tightening portions 72.

The vehicle body rear portion 10, to which a rear structure of a vehicle body according to the present embodiment is applied, is configured basically as has been described above. The operations and advantages will be described below.

In the present embodiment, at the rear part 34 posterior from the center of the joining portion where the stiffener 20 is joined with the member 14, the member 14 is disposed with inclination such that the rear-end lower end portion 34a of the rear part 34 (see the shaded portion in FIG. 1) of the member is located higher by dimension H than the front-end lower end portion 34b of the rear part 34 (see FIG. 1).

Accordingly, in the present embodiment, when a load (upward thrust load) acting, for example, from the shock absorber of a rear suspension mechanism, not shown, is transferred through the rear wheel house inner 16a and the stiffener 20 to the member 14, it is possible to improve the load transfer efficiency from the stiffener 20 to the member 14 by disposing with upward inclination (forming in a curved shape) the rear part 34 of the member 14 such as to be along the load transfer direction from the stiffener 20, the rear end of the rear part 34 facing upward, and thereby increase the load transfer amount to the rear pillar 12.

As a result, in the present embodiment, as it is possible to sufficiently support a load by the rear pillar 12 even without increasing the size and the plate-thickness of the stiffener 20 and the member 14, it is possible to improve the stiffness and the strength of the vehicle body rear portion 10 while inhibiting an increase in the weight of the vehicle body. Incidentally, 'stiffness' refers to non-deformability of the vehicle body (strength of non-deformation of the vehicle body) against an external force, and 'strength' refers to an overall strength including various strengths such as compressive strength, tensile strength, torsional strength, bending strength, and the like.

Further, in the present embodiment, as shown in FIG. 1, the center line A1 of the rear part 34 of the member 14 is arranged with inclination such as to be substantially perpendicular to the center line A2 of the rear pillar 12, and a load can be transferred from the member 14, being thereby dispersed with an appropriate balance along the upper/lower direction of the rear pillar 12, which enables improving the load transfer efficiency to the rear pillar 12.

Further, in the present embodiment, the stiffener 20 is disposed in a state of being inclined substantially perpendicular to the rear pillar 12, and the load transfer efficiency from the stiffener 20 to the member 14 and the rear pillar 12 can thereby be improved.

Still further, in the present embodiment, the lap portion 28 formed by superimposing and joining the lower end of the rear pillar upper 12a and the upper end of the rear pillar lower 12b with each other is provided, and the lap portion 28 can be reinforced by joining the member 14 with the lap portion 28. Yet further, a load transferred from the stiffener 20 can be received by the lap portion 28, which is formed by lapping two plates, and the load is further firmly supported by the rear pillar 12 having the lap portion 28.

Still further, in the present embodiment, as shown in FIGS. 3A and 3B, the vertical flange 37a formed by the rear end of the member 14 is joined, by being hit against, with the front surface 30a of the rear pillar 12, and the lap portion 28 is thus reinforced. Further, a load transferred from the stiffener 20 can be further firmly supported by the lap portion 28 of the front surface 30a of the rear pillar 12.

Yet further, for example, in comparison with a case of forming flanges respectively on the vertical, the upper, and the lower walls of an inner member by forming the inner member with a cross-section in a hat shape, it is possible in the present embodiment, by providing the inner member 36 with the vertical flange 37a and the horizontal flange 37b (see FIG. 5B), to improve the formability of the flanges for joining the rear end of the member 14 with, by hitting against, the front surface 30a of the rear pillar 12. Also, it is possible to efficiently transfer a load, which transfers from the member 14 toward the rear pillar 12, by the vertical flange 37a and the horizontal flange 37b formed on the inner member 36.

Further, in the present embodiment, as shown in FIG. 3B, the pillar flange 32 of the rear pillar 12 and the vehicle-rear-side end portion 37e of the upper wall flange 37d of the inner member 36 forming the member 14 are joined with each other. Herein, if the horizontal flange 37b of the inner member 36 were directly joined with the front surface 30a of the rear pillar 12, although the load transfer efficiency from the horizontal flange 37b to the rear pillar 12 would be improved, as the horizontal flange 37b of the inner member 36 is formed in a shape curved upward toward the rear end thereof, the dimension in height of the horizontal flange 37b in the upper/lower direction becomes larger by providing the joining horizontal flange 37b with a margin for joining with the rear pillar 12, which causes a problem with the formability of the inner member 36.

In this situation, in the present embodiment, the vehicle-rear-side end portion 37e formed by the rear end of the upper wall flange 37d located in the vicinity of the horizontal flange 37b of the inner member 36 is joined with the pillar flange 32, and while the problem with formability of the inner member 36 is thereby solved, the load transfer efficiency from the horizontal flange 37b to the rear pillar 12 can be improved.

Still further, in the present embodiment, the stiffener 20 is screw-tightened (tightened together) to the first bulkhead 42 through the inner member 36 (see FIG. 2, FIGS. 5A and 5B, and FIG. 7A), the stiffness of the member 14 alone is thereby improved, and the joining strength between the stiffener 20 and the member 14 is also improved, which enables further improvement in the efficiency of load transfer to the rear pillar 12.

Yet further, in the present embodiment, the second bulkhead 44 and the first bulkhead 42 are respectively joined with the inner member 36 and the outer member 38 of the member 14 (see FIG. 5B and FIG. 6B), deformation of the inner member 36 and the outer member 38 is thereby inhibited, and as a result, the stiffness and the strength of the member 14 alone can be further improved.

Further, in the present embodiment, even in a case of forming the closed cross section 40 (see FIG. 4C) by joining the inner member 36 and the outer member 38 of the member 14, it is easy to access the wall partitioning flange 62 of the second bulkhead 44 through the working penetration hole 50. For example, making use of the working penetration hole 50, spot welding work can be carried out on the wall partitioning flange 62, using a spot welding gun, not shown. Further, for example, in a case of providing the wall partitioning flange 62 with a screw tightening hole, not shown, an operator can carry out screw tightening work or the like through the working penetration hole 50. As a result, in the present embodiment, the second bulkhead 44 joined with the inner vertical wall 36a can be easily joined with (tightened to) the outer vertical wall 38a, and the stiffness and the strength of the member 14 formed with the closed cross section 40 can be improved.

Still further, in the present embodiment, the stiffener 20 has a lower end formed with a cross-section in a hat state (see FIG. 7C), the stiffener 20 is formed such that the cross-section is open in a region from the lower end up to a certain point toward the upper end, and accordingly, a high stiffness and a high strength are attained to enable ensured transfer of a load. Further, the upper end of the stiffener 20, which is the joining part (the first tightening portion 64) with the member 14, is formed in a surface state without an open cross-section (see FIG. 7B), and it is thereby possible to efficiently transfer a load to the surface of the inner vertical wall 36a of the member 14 (the inner member 36). That is, if the first tightening portion 64 were formed with a hat-state cross-section being an open cross-section, when a turning load is input in the vehicle front/rear direction with the upper end of the stiffener 20 as the turning center, this open cross-section is crush-deformed, and a load escapes to drop the load transfer efficiency, the load transfer being from the stiffener 20 to the member 14. In comparison, in the present embodiment, the first tightening portion 64 is formed in a surface state, and a turning load of the stiffener 20 can also be efficiently transferred along the surface of the inner vertical wall 36a. Further, by gradually reducing, toward the upper end, the size of the open cross-section in the region between the upper end and the lower end of the stiffener 20, it is possible to eliminate a rapid change in the open cross-sectional shape in the region between the upper end and the lower end of the stiffener 20 and thus enable a high efficiency of the load transfer.

Yet further, in the present embodiment, the stiffener 20 is provided with the endward expanding shape portion 68 such that the width along the front/rear direction of the vehicle body becomes gradually larger from a certain point, along the longitudinal direction, of the stiffener 20 toward the upper end, and a load is transferred from the stiffener 20 to the member 14, being thereby dispersed into a wide range, which enables improvement in the efficiency of load transfer from the stiffener 20 to the member 14.

Still further, in the present embodiment, the first tightening portion 64 at the upper end of the stiffener 20 joined with the member 14 is provided with the pair of screw-tightening holes 66 (see FIG. 7A), thereby, turning of the stiffener 20 in the vehicle front/rear direction with the first tightening portion 64 as the turning center is inhibited, and a load that is transferred from the stiffener 20 to the member 14 can be efficiently transferred without escaping.

DESCRIPTION OF REFERENCE SYMBOLS

10 . . . vehicle body rear portion
12 . . . rear pillar
12a . . . rear pillar upper
12b . . . rear pillar lower
14 . . . member
16 . . . rear wheel house
20 . . . stiffener
28 . . . lap portion
30a . . . front surface
34 . . . rear part
34a . . . rear-end lower end portion
34b . . . front-end lower end portion
36 . . . inner member
36a . . . inner vertical wall
36b . . . inner upper wall
37c . . . extended end of inner upper wall
37d . . . upper wall flange
37e . . . vehicle-rear-side end portion
38 . . . outer member
38a . . . outer vertical wall
38b . . . outer lower wall
39a . . . extended end of outer lower wall
40 . . . closed cross section
42, 44 . . . bulkhead
50 . . . working penetration hole
62 . . . wall partitioning flange
66 . . . screw tightening holes (two joining portions)
68 . . . endward expanding shape portion

The invention claimed is:
1. A rear vehicle body structure, comprising:
a rear pillar extending in a vertical direction at a rear portion of the vehicle body;
a member extending from a certain point, in the vertical direction, of the rear pillar toward a front side of the vehicle body;
a rear wheel house disposed lower than the rear member; and
a stiffener joined at an lower end thereof with the rear wheel house and joined at an upper end thereof with the member,
wherein the member is disposed with an inclination, at least at a rear part thereof extending backward from a joining portion where the stiffener is joined, such that a lower end portion of a rear end of the rear part is located higher than a lower end portion of a front end of the rear part,
wherein the rear pillar is disposed with an inclination rising forward such that an upper end thereof is located on a front side,
wherein the rear part is inclined such as to be substantially perpendicular to the rear pillar, and
wherein the stiffener is disposed with an inclination with respect to a line extending from the front end in the vertical direction downward, rising backward such that an upper end thereof is located posterior to a lower end thereof and such that the stiffener is substantially perpendicular to the rear pillar.

2. The rear vehicle body structure according to claim 1,
wherein the member is disposed with an inclination, at least at a rear part thereof extending backward from a joining portion where the stiffener is joined, such that a lower end portion of a rear end of the rear part is located higher than a lower end portion of a front end of the rear part,
wherein the rear pillar is formed by a rear pillar upper on an upper side and a rear pillar lower on a lower side,
wherein the rear pillar comprises a lap portion formed by that a lower end of the rear pillar upper and an upper end of the rear pillar lower are superimposed and joined with each other,
and wherein a rear end of the member is joined with the lap portion.

3. A rear vehicle body structure, comprising:
a rear pillar extending in a vertical direction at a rear portion of the vehicle body;
a member extending from a certain point, in the vertical direction, of the rear pillar toward a front side of the vehicle body;
a rear wheel house disposed lower than the rear member; and
a stiffener joined at an lower end thereof with the rear wheel house and joined at an upper end thereof with the member,
wherein the member is disposed with an inclination at least at a rear part thereof extending backward from a joining portion where the stiffener is joined, such that a lower end portion of a rear end of the rear part is located higher than a lower end portion of a front end of the rear part,
wherein the rear pillar has a front surface facing the front side of the vehicle body,
wherein a rear end of the member is joined with the front surface, being butted against the front surface,
wherein the member comprises an inner member and an outer member,
wherein the inner member has an inner vertical wall on a vehicle interior side and an inner upper wall extending from an upper end of the inner vertical wall toward a vehicle exterior side,
wherein a lower end of the inner vertical wall and an extended end of the outer lower wall are joined with each other, an upper end of the outer vertical wall and an extended end of the inner upper wall are joined with each other, and a closed cross section is thereby formed,
wherein the inner member comprises a vertical flange extending from a rear end of the inner vertical wall toward the vehicle interior side and facing the front surface of the rear pillar, and a horizontal flange extending from a rear end of the inner upper wall toward an upper side of the vehicle body, and
wherein at least the vertical flange is joined with the front surface of the rear pillar.

4. The rear vehicle body structure according to claim 3,
wherein the rear pillar comprises a pillar flange extending from the front surface toward the front side of the vehicle body,
wherein the inner upper wall comprises an upper wall flange standing upward from the extended end and facing the pillar flange,
and wherein the pillar flange and an end portion, on a rear side of the vehicle body, of the upper wall flange are joined with each other.

5. The rear vehicle body structure according to claim 3, comprising:
a bulkhead disposed such as to partition the closed cross section of the member into plural divisions in a longitudinal direction of the vehicle body,
wherein an upper end of the stiffener is disposed at a position superimposing with the bulkhead with respect to a vehicle transverse direction, and is joined with the bulkhead through the inner member.

6. The rear vehicle body structure according to claim 5,
wherein plural bulkheads are arranged at a certain distance therebetween in a longitudinal direction of the member,
wherein at least one of the plural bulkheads is joined with the inner member,
and wherein at least another one of the plural bulkheads is joined with the outer member.

7. The rear vehicle body structure according to claim 5,
wherein the bulkhead is attached to either one of the inner vertical wall or the outer vertical wall and a working penetration hole is formed through the other vertical wall,
and wherein the bulkhead is provided with a wall partitioning flange extending in the other vertical wall to a position accessible from the working penetration hole.

8. A rear vehicle body structure, comprising:
a rear pillar extending in a vertical direction at a rear portion of the vehicle body;
a member extending from a certain point, in the vertical direction, of the rear pillar toward a front side of the vehicle body;
a rear wheel house disposed lower than the rear member; and
a stiffener joined at an lower end thereof with the rear wheel house and joined at an upper end thereof with the member,
wherein the member is disposed with an inclination, at least at a rear part thereof extending backward from a joining portion where the stiffener is joined, such that a lower end portion of a rear end of the rear part is located higher than a lower end portion of a front end of the rear part,
wherein the stiffener has a lower end formed with a cross-section in a hat state and an upper end formed in a surface state,
and wherein the stiffener is formed such that an open cross-section of a region between the lower end and the upper end gradually shrinks from the lower end toward the upper end.

9. The rear vehicle body structure according to claim 8,
wherein the stiffener has an endward expanding shape portion such that a width in a longitudinal direction of the vehicle body becomes gradually larger from a certain point, in a longitudinal direction, of the stiffener toward the upper end.

10. The rear vehicle body structure according to claim 8,
wherein the upper end of the stiffener is provided with at least two joining portions.

* * * * *